United States Patent
Anzai

[19]

[11] Patent Number: 5,977,655
[45] Date of Patent: Nov. 2, 1999

[54] LOCK ACTUATOR ASSEMBLY FOR A STEERING LOCK AND IGNITION SYSTEM

[75] Inventor: Hidehiko Anzai, Hilliard, Ohio

[73] Assignee: Honda Giken Kogyo Kabushiki Kaisha, Tokyo, Japan

[21] Appl. No.: 09/019,694

[22] Filed: Feb. 6, 1998

Related U.S. Application Data

[60] Provisional application No. 60/037,357, Feb. 21, 1997.

[51] Int. Cl.$^6$ ................................................. B60R 25/02
[52] U.S. Cl. ..................... 307/10.3; 307/10.2; 307/10.6; 70/237; 180/287
[58] Field of Search .................................. 307/10.1, 10.2, 307/10.3, 10.6; 70/237, 252; 340/825.31, 825.32, 425.5, 426; 180/287; 123/179.1, 179.3

[56] References Cited

U.S. PATENT DOCUMENTS

| | | | |
|---|---|---|---|
| 3,572,067 | 3/1971 | Kimberlin | 70/252 |
| 3,650,131 | 3/1972 | Eichenauer | 70/252 |
| 4,332,306 | 6/1982 | Turatti | 307/10.3 |
| 5,036,687 | 8/1991 | Takeuchi | 70/252 |

FOREIGN PATENT DOCUMENTS

| | | |
|---|---|---|
| 0 742 127 A2 | 11/1996 | European Pat. Off. . |
| 59138047 | 10/1981 | Japan . |
| 03224978 | 10/1991 | Japan . |

*Primary Examiner*—Albert W. Paladini
*Attorney, Agent, or Firm*—Nikaido Marmelstein Murray & Oram LLP

[57] ABSTRACT

A lock actuator assembly for a steering lock and ignition assembly has a two position knob for operating an ignition switch of a vehicle and for operating a steering lock mechanism of the vehicle. The knob is retained within a housing by a latch device until authorization by an authorization system is provided to the latch device. When authorization is received, the latch device releases the knob from the housing so that the steering lock mechanism can unlock the steering shaft and the ignition switch can be operated to start the vehicle.

15 Claims, 3 Drawing Sheets

LOCK ACTUATOR ASSEMBLY FOR A STEERING LOCK AND IGNITION SYSTEM

This application claims the benefit of U.S. Provisional Application No. 60/037,357, filed Feb. 21, 1997.

BACKGROUND OF THE INVENTION

1. Field of the Invention

The present invention is directed to a lock actuator assembly for a steering lock and ignition system which can be used with a system which indirectly activates an ignition assembly such as by a user identification and authorization system. The lock actuator assembly does not use a conventional mechanical key. In particular, the lock actuator assembly has a two position knob for operating a conventional ignition switch and steering lock mechanism.

2. Description of the Prior Art

Prior art lock actuators for steering lock and ignition systems are well known and use a conventional mechanical key. U.S. Pat. No. 3,572,067 shows one example of a steering shaft and ignition system having a conventional key lock actuator assembly.

In this conventional key system, the user of the vehicle must carry a conventional metal key which enables him to operate the ignition switch as well as unlock other devices such as the vehicle doors, the glove box, and the trunk. If the key is lost or stolen, the user will not have access to the vehicle. If the owner's key operates all the vehicle locks, and the owner then gives his key to a third party such as a driver or valet, that person will have access to all the vehicle locks. Furthermore, if the driver gives his key to a non-driver such as a child, so that the non-driver can enter the vehicle, the non-driver can then insert the key into the ignition, start the vehicle and drive the vehicle.

Thus, the prior art systems require the carrying of a key which can be lost, misplaced or damaged. Furthermore, the prior art systems do not identify a particular person and therefore provide a level of access or authorization to the person who possesses the key.

SUMMARY OF THE INVENTION

It is a primary object of the present invention to provide a lock actuator assembly for a steering lock and ignition assembly which does not require a conventional metal key for operation.

It is still another object of the present invention in which the lock actuator assembly for the steering lock and ignition assembly has a knob which can be extended or retracted such that in the retracted position, the vehicle can not be started and the steering assembly is locked whereas in the extended position, the ignition switch can be operated and the steering assembly unlocked.

It is still another object of the present invention to provide a lock actuator assembly for a steering lock and ignition assembly in which the knob can be rotated relative to a housing.

It is still another object of the present invention to provide a lock actuator assembly for a steering lock and ignition assembly which inhibits rotation of the knob until the knob is extended.

It is still another object of the present invention to provide a lock actuator assembly for a steering lock and ignition assembly having a latch for holding the knob in a retracted position.

It is still another object of the present invention to provide a lock actuator assembly for a steering lock and ignition assembly in which the latch includes a solenoid and a displaceable pin which releasably engages the knob.

It is still a further object of the present invention to provide a lock actuator assembly for a steering lock and ignition assembly which can be used with a keyless vehicle operation identification and authorization system which positively identifies the operator of the vehicle.

It is a further object of the present invention to provide a lock actuator assembly for a steering lock and ignition assembly which is used with a keyless vehicle operation identification and authorization system which identifies the owner or primary operator of the vehicle by means of a biometric characteristic such as a user's fingerprint, retina or voice.

The present invention is directed to a lock actuator assembly for a steering lock and ignition assembly comprising a housing, an ignition switch within the housing, a steering lock within the housing, a knob, and a coupling provided with the knob. The assembly is connected to the steering lock when the knob is retracted and rotated to one of at least two positions. The knob is connected to the ignition switch when the knob is extended and rotated to another one of the at least two positions. Furthermore, the coupling permits extension and retraction of the knob relative to the housing and permits rotation of the knob relative to the housing. A stop inhibits the rotation until the knob is extended.

DETAILED DESCRIPTION OF THE PREFERRED EMBODIMENT

Figure 1:
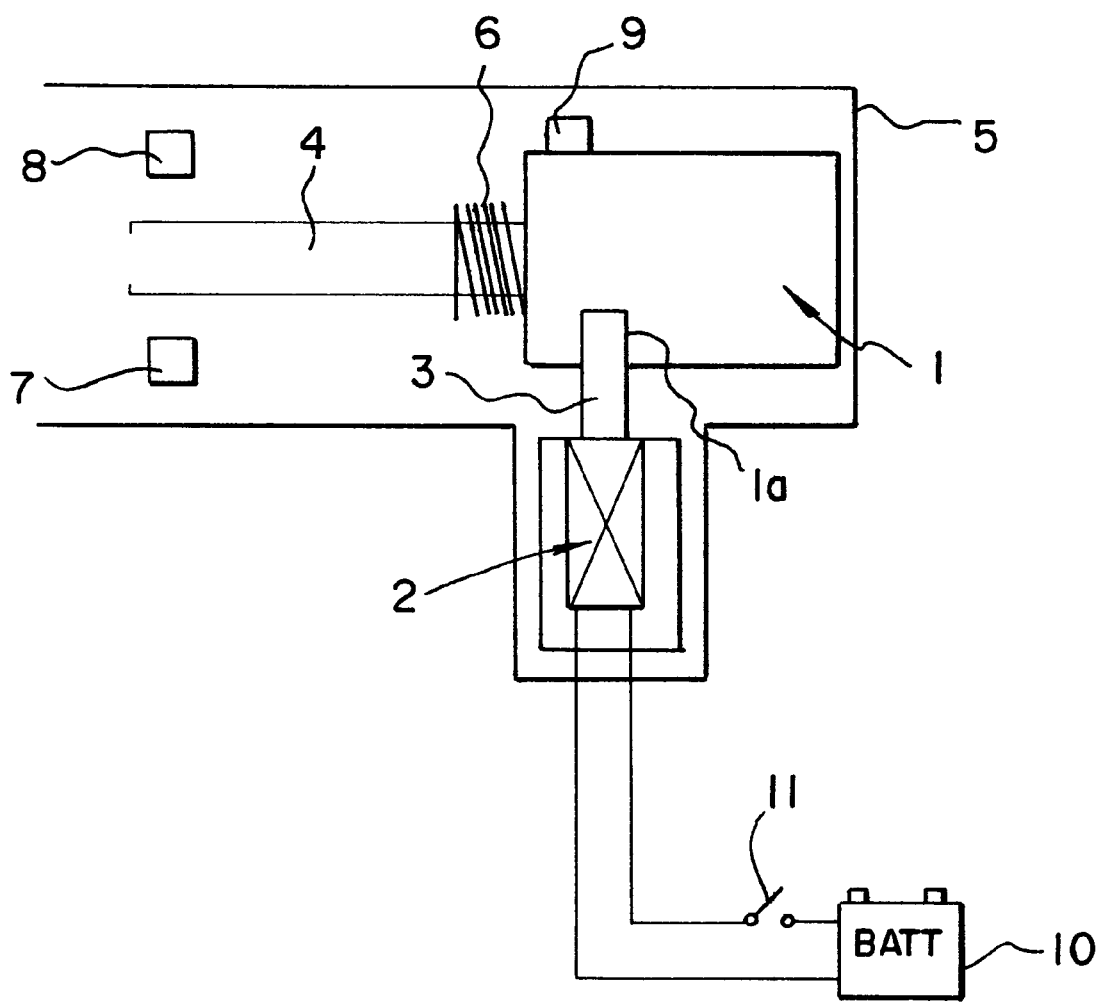
FIG. 1 is a side view of the lock actuator assembly for a steering lock and ignition assembly with a knob in a retracted position.
Figure 2:
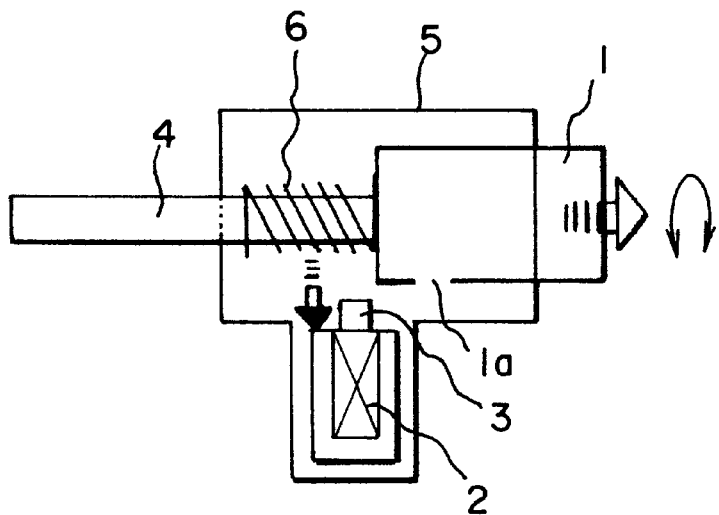
FIG. 2 is a sectional view of the lock actuator assembly for a steering lock and ignition assembly with the knob in the extended position.
Figure 3:
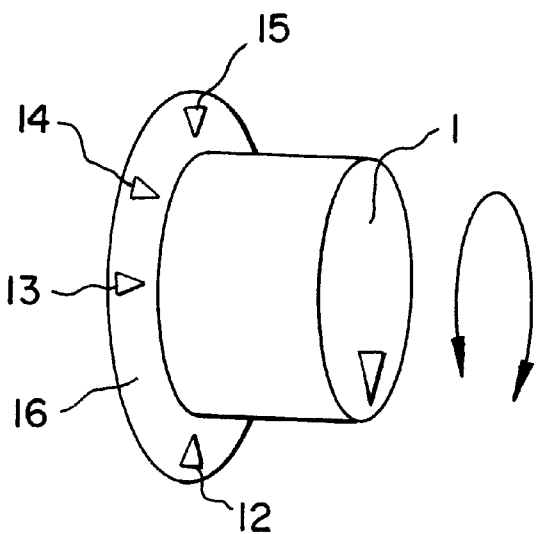
FIG. 3 is an end view of the knob in the extended lock position.
Figure 4:
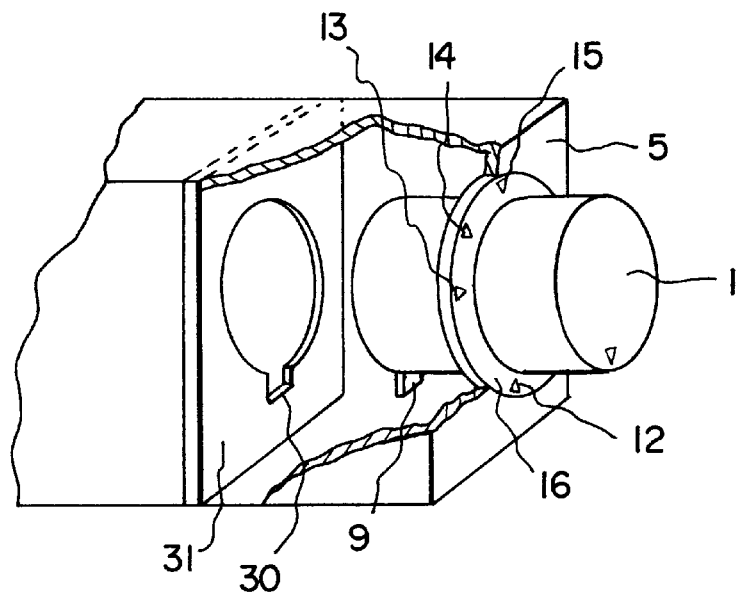
FIG. 4 is a simplified perspective view showing a retraction prevention feature of the present invention.
Figure 5:
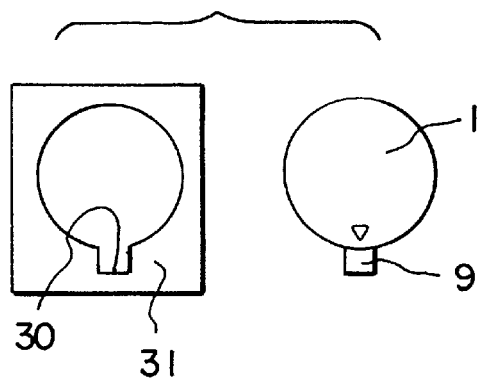
FIG. 5 is a front view showing the retraction prevention plate and the retraction tab on the ignition knob.

Referring to FIGS. 1–3, the lock actuator assembly for steering lock and ignition assembly comprises a housing 5, an ignition knob 1, spring 6, solenoid 2, stopper pin 3, and an indication plate 16 (see FIG. 3). The ignition knob 1 is mounted on a shaft 4. The shaft 4 allows the ignition knob 1 to extend from and retract into the housing 5 and to rotate. The shaft 4 also interconnects the ignition knob 1 with the ignition switch 8 and steering lock assembly 7 in a conventional manner (not shown).

In the secure position as shown in FIG. 1, the lock actuator assembly for the steering lock and ignition assembly is secured since the ignition knob 1 is retracted into the housing 5 so that an ignition switch 8 cannot be activated. The ignition switch 8 is conventionally known and therefore not shown in detail. The ignition knob 1 is shown in the LOCK position 12 such that a steering lock assembly 7 is locked and cannot be rotated. The steering lock assembly 7 is conventionally known assembly and therefore is not shown in detail. The ignition knob 1 is held in place by stopper pin 3 which is extended and inserted into recess 1a of ignition knob 1. The solenoid 2 is in a deenergized state when stopper pin 3 is extended.

When a user identification and authorization system, a remote signal transmitter or code from a keypad provides authorization for the ignition switch 8 to be activated (i.e., when the user of the vehicle has authorization to start and drive the vehicle), switch 11 is closed and power from battery 10 is applied to solenoid 2. The solenoid 2 is energized and stopper pin 3 of solenoid 2 is pulled in by a magnetic force of the solenoid (see FIG. 2). Since the stopper pin 3 no longer engages recess 1a of the ignition knob 1, the ignition knob 1 is pushed by the force of spring 6 into a projected or extended position.

Once the ignition knob 1 is extended through the indicator plate 16 by spring 6, the solenoid 2 is deenergized and the stopper pin 3 of the solenoid is moved down by the force of a spring (not shown) inside solenoid 2. Thus, with the ignition knob 1 now extended (see FIG. 2) the conventional steering lock and ignition assembly is in a state as though a conventional metal key were inserted into a lock assembly. Thus, the steering lock assembly 7 can now be unlocked and the vehicle started by activating the ignition switch 8 as in a conventional steering lock and ignition assembly.

In order to unlock the steering lock assembly 7, the ignition knob 1 must be rotated from the LOCK position 12 shown in FIG. 3 to the ACC position 13. When the ignition knob 1 is turned from the LOCK position 12 to the ACC position 13, the steering lock assembly 7 is unlocked as in a conventional lock system. Furthermore, the steering lock assembly 7 is retained in the unlocked position until the ignition knob 1 is completely pushed into the housing 5. Thus, accidental locking of the steering lock assembly 7 can be avoided. Furthermore, with the ignition knob 1 in the ACC position 13, the vehicle battery 10 is connected to the vehicle accessories to provide power thereto such as the radio, windows, etc. as in a conventional metal key system.

The steering lock assembly 7 remains in the same unlocked position when the ignition knob 1 is turned from the ACC position 13 to the ON position 14 or is turned from the ON position 14 to the START position 15. Thus, the steering lock assembly 7 remains unlocked.

The vehicle can be started by rotating the ignition knob 1 from the ACC position 13 to the START position 15 such that the ignition switch 8 is activated as in a conventional lock system. After starting the vehicle, the ignition knob 1 is released by the driver and the ignition knob 1 returns to the ON position 14 as is conventional with a metal key system. In the START position 15, the vehicle battery 10 provides power to the ignition switch 8 and start switch (not shown). In the ON position 14, the vehicle battery 10 provides power to the vehicle accessories and ignition switch 8.

When the driver of the vehicle wishes to stop and park the vehicle, the ignition knob 1 is turned counter clockwise from the ON position 14 to the ACC position 13. The steering lock assembly 7 remains in the unlocked position. The ignition knob 1 cannot be retracted into the housing 5 until a retraction tab 9 on the ignition knob 1 is aligned with the notch 30 of a retraction prevention plate 31. In the ACC, ON and START positions, the tab 9 is in abutment with the retention plate 31. The ignition knob 1 cannot be retracted until it is rotated to the LOCK position 12 where the tab 9 and the notch 30 are in alignment. Only then can the ignition knob 1 be pushed into the housing 5 flush with the face of the indication plate 16. When the ignition knob 1 enters into the housing 5 completely, the steering lock assembly 7 finally locks the steering shaft against rotation. Furthermore, the stopper pin 3 snaps into the recess 1a of the ignition knob 1 so as to retain the ignition knob 1 within the housing 5 until the solenoid 2 is again energized.

With the lock actuator assembly for a steering lock and ignition assembly of the present invention, a vehicle can be started without using a conventional key which can be lost, misplaced or damaged.

While the lock actuator assembly for a steering lock and ignition assembly of the present invention may be activated by a signal from a remote transmitter or code from a keypad, the present invention may be used with a keyless authorization system which identifies the owner or primary operator by means of a biometric characteristic such as a user's fingerprint, retina or voice.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore to be embraced therein.

What I claim:

1. A lock actuator assembly for a steering lock and ignition assembly comprising:

a housing;

an ignition switch within said housing;

a steering lock within said housing;

a knob; and a coupling providing said knob with an extended position, a retracted position, and at least two rotated positions, all relative to said housing;

wherein in the extended position, said knob allowing said steering lock to unlock when said knob is rotated to one of said at least two positions and said knob allowing said ignition switch to operate when said knob is rotated to another one of said at least two positions.

2. The lock actuator assembly of claim 1, wherein said coupling includes a stop for preventing rotation of said knob when knob is in said retracted position.

3. The lock actuator assembly of claim 1, further comprising:

a spring connected to said knob, said spring biasing said knob to extend from said housing.

4. The lock actuator assembly of claim 3, further comprising:

a latch holding said knob flush to said housing when said knob is retracted within said housing.

5. The lock actuator assembly of claim 4, wherein said latch comprises:

a solenoid;

a pin displaceable by said solenoid; and a recess in said knob;

said pin releasably engaging said recess when said knob is in said retracted position.

6. An interconnection means for interconnecting a steering lock and ignition assembly comprising:

a housing;

a knob;

a coupling connecting said knob to said housing, said coupling permitting extension and retraction of said knob relative to said housing and permitting rotation of said knob relative to said housing; and a stop inhibiting said rotation of said knob until said knob is extended.

7. A lock actuator assembly for a steering lock and ignition assembly comprising:

a housing;

an ignition means for starting a vehicle;

a lock means for locking a steering shaft of the vehicle;

movable knob means for retracting into said housing, for extending out of said housing and for rotating about an axis of said housing when extended, said movable knob means allowing said ignition means to operate when rotated to a first position and allowing said lock means to lock when rotated to a second position and retracted into said housing.

8. A lock actuator assembly according to claim 7, wherein said latch means includes a solenoid, a pin displaceable by said solenoid and a recess provided in said movable knob means, wherein said pin releasably engages said recess in said movable knob means when said movable knob means is in a retracted position.

9. A lock actuator assembly according to claim 7, wherein said movable knob means includes a knob and a stop for preventing said knob from rotating when retracted.

10. A lock actuator assembly according to claim 7, further comprising a spring for biasing said movable knob means to extend from said housing.

11. A lock actuator assembly according to claim 7, wherein said first position is a start position for starting the vehicle and said second position is a lock position for locking said lock means.

12. A lock actuator assembly according to claim 11, wherein said movable knob means further rotates to an accessory position for providing power to accessories of the vehicle and for unlocking said lock means when said movable knob means is extended and rotated from the lock position.

13. A lock actuator assembly according to claim 7, wherein said movable knob means includes latch means for holding said movable knob means flush to said housing when retracted into said housing.

14. A lock actuator assembly according to claim 13, wherein said latch means is activated by a user authorization system.

15. A lock actuator assembly according to claim 14, wherein said user authorization system is a keyless system using a biometric characteristic.

* * * * *